Aug. 31, 1937.  C. F. ADLER ET AL  2,091,577
POSITIVE ACTING ROTARY ENGINE
Filed Oct. 15, 1931  5 Sheets-Sheet 4

INVENTORS
CARLOS F. ADLER
& WALTER BEJEUHR
BY
THEIR ATTORNEY

Patented Aug. 31, 1937

2,091,577

UNITED STATES PATENT OFFICE 2,091,577

POSITIVE ACTING ROTARY ENGINE

Carlos F. Adler and Walter Bejeuhr, Paterson, N. J.

Application October 15, 1931, Serial No. 569,028

26 Claims. (Cl. 123—8)

This invention relates to prime movers in which the static or dynamic energy contained in a fluid is transferred into mechanical energy of rotation, compressors or pumps in which that process is reversed, and also to prime movers adapted to make use of the dynamic energy created by the combustion of fluids.

The primary object of our invention has been to provide positive acting, rotating means for the creation, conversion or utilization of energy.

Another object of this invention has been to provide a uniform, unidirectional speed of movement of all the moving parts of such an engine, such speed of movement being predeterminedly related to the speed of movement of the part from which the energy is finally transmitted for use.

Other objects of our invention will be brought forth in the exemplary description and drawings which form part of this patent application.

In developing our invention we make use of a chamber comprising two similar channels which are helically entwined in a circle along a substantially circular path, the chamber being toroidal, and the channels are sub-divided by a partition which centrally extends through said spirally disposed channels. The partition establishes part channels in the helical channels, which increase and decrease peripherally, whereas a transverse cross-section of said combined helical channels remains substantially the same. A body, piston, or disc, substantially of the shape of said cross-section, is propelled through said helical channels by the force of movement or of expansion of fluids introduced into said part channels. The energy set up between the helically entwined channels and the body, piston, or disc moving in relation thereto creates the torque, which is ultimately utilized.

In the drawings, in which similar numerals refer to similar parts throughout the various views:—

Figs. 32 and 33 illustrate in sectional detail front and side views, respectively, the valve gearing of the engine of Figs. 28, 29, 30, and 31.

The engine shown in a sectioned side elevation in Fig. 34 represents a mechanically reversed modification of the arrangements of Fig. 9.

Figure 9:
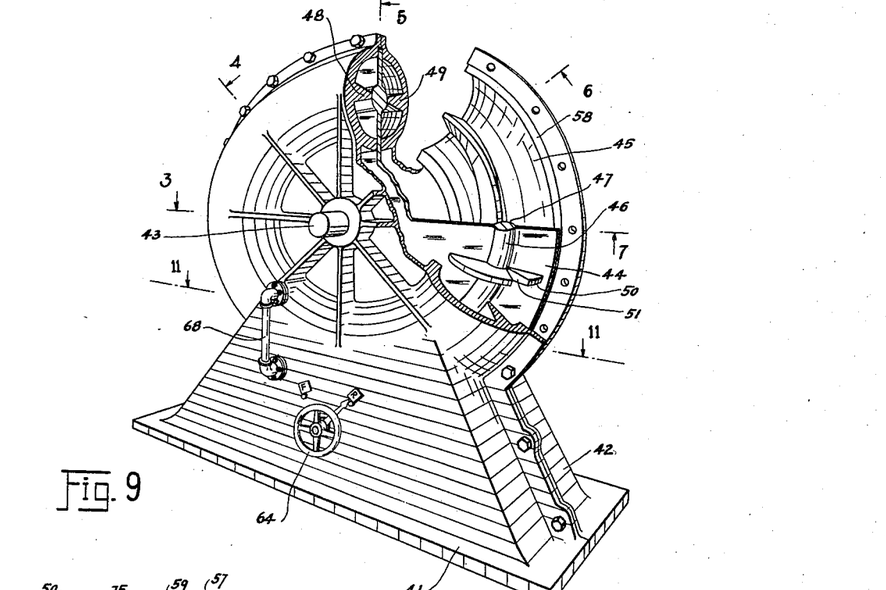
Fig. 9 shows the partly sectioned perspective view of an engine, from the channels of which the cross-sections of the prior figures are taken.

The housing of Fig. 9 comprises similar front and back halves 41 and 42, which are bolted together. The housing centrally supports a shaft 43, upon which is mounted a substantially flat, concentrically disposed partition 44, said partition being fixedly mounted upon and adapted to revolve with said shaft. The partition 44 extends substantially centrally through the cylindrical annulus or toroidal chamber 45, the walls of which are formed by the front 41 and the rear 42 of the housing of the engine. Concentric with annulus 45, substantially half round lugs 46 and 47, (complementarily forming a tore) extend from the front and from the rear of partition 44.

From opposite sides of the annulus the two walls 48 and 49 which form continuation halves of a helically disposed dividing wall radially extending into the annulus, substantially into sliding abutment with the lugs 46 and 47. The walls 48 and 49 pass through half a convolution along the full circular extent of the annulus so that the pitch of the respective helix is twice the circumference of the pitch circle of said annulus.

The partition 44 is provided with a radially disposed slot of a length substantially equal to the diameter of the cylindrical annulus. In that slot is rotatingly slidably accommodated the disc 50. The thickness of disc 50 is such, that it slidably abuts upon the sides of the slot in partition 44 and its periphery is engaged in slidable abutment upon the inner walls of the cylindrical annulus 45. The disc 50 is provided upon opposite sides with truncated sector openings 51, which extend into the disc up to the diameter of the half round lugs 46 and 47, and which slidably accommodate the helical walls 48 and 49, respectively. The disc 50 is carried through the annulus by the rotating partition 44 and it is angularly guided by the walls 48 and 49. When the shaft 43 together with the partition 44 makes one revolution, the disc 50 will therefore rotate around its own axis through half a rotation, in conformity with the pitch of the helically disposed walls 48 and 49.

Figure 1:
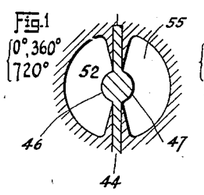
Figs. 1, 2, 3, 4, 5, 6, 7, and 8 show cross-sections of a pair of helically entwined channels, taken 45° apart from each other along the circle in which said channels are endlessly disposed. The respective angular positions in relation to a full cycle of operation are indicated below the numerals of the figures.
Figure 2:
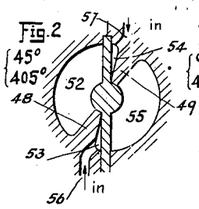
Figure 3:
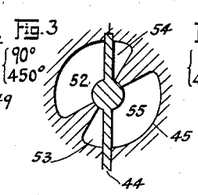
Figure 4:
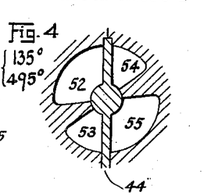
Figure 7:
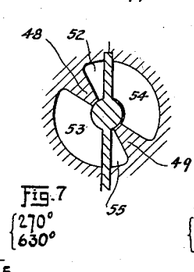
Figure 8:
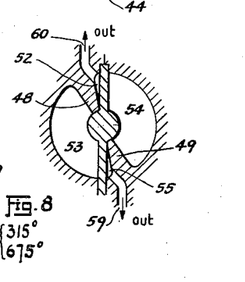

The partition 44 extends in slidable abutment through the walls of the cylindrical annulus 45 and through the helically disposed walls 48 and 49, where it merges therewith. When the disc 50 is disposed at the position of Fig. 9, which would be in close proximity to the point at which the cross-section of Fig. 7 is taken, the cylindrical annulus is subdivided into four substantially closed chambers 52 and 53, 54 and 55, the first pair in front of partition 44, the second pair in the rear of said partition. The chambers 52 and 53, and 54 and 55, are respectively continuations of each other on the respective sides of the partition, but they are respectively separated from each other by the parts of disc 50 extending to the front and to the rear through partition 44. When the disc 50 is disposed in the lowest part of the cylindrical annulus and at a position near the cross-section of Fig. 1, there are only two chambers in the annulus, one to the left and one to the right of partition 44, because the helically disposed walls 48 and 49 merge with the partition 44, at that point.

To the left of that position, the chambers 53 and 54 develop in the front and in the back of partition 44 respectively, as the helix of walls 48 and 49 departs from that partition. Starting from the position of Fig. 1, and following the cylindrical annulus, in clockwise direction, the cross-sections of Figs. 2, 3, 4, 5, 6, 7 and 8 show the annulus 45°, 90°, 135°, 180°, 225°, 270°, and 315°, respectively, away from the position of Fig. 1 and viewed in a counterclockwise direction.

Let us imagine that during the clockwise rotation of shaft 43, the disc 50 is just ahead of the various cross-sections of said figures, i. e., has just past the positions of said cross-sections. Into the developing chambers 53 and 54 steam is injected, exemplarily at the point of the cross-section of Fig. 2, through inlets 56 and 57, respectively. The helical walls are stationary. The partition 44 is movable, but not in respect to the chambers contained in the annulus: in respect to those, it is relatively stationary. However, the part of disc 50, which closes said chambers in a clockwise direction, is movable and propelled in that direction by the steam, the chambers 53 and 54 steadily increasing, as the disc 50 passes through the position of Figs. 3, 4, 5, 6, 7, and 8. After the disc has again passed through the position of Fig. 1, the still increasing chamber 54 now merges into the chamber 55 shown in that figure. But the disc now begins rearwardly to shorten the length of the chamber containing the steam, having again entered upon chamber 54, and the source of steam is shut off, after the disc has passed the inlet 57 of Fig. 2. When the disc now reaches for a second time the position of Fig. 5, we have passed through 540° and the volume of the steam in the chambers 54 and 55 has now reached a maximum, as can readily be seen from the diagram of Fig. 10 which shows the developed chambers 54 and 55 to the rear of the partition 44.

Figure 5:
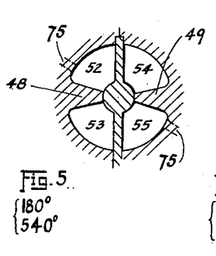
Figure 6:
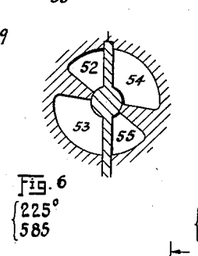
Figure 10:
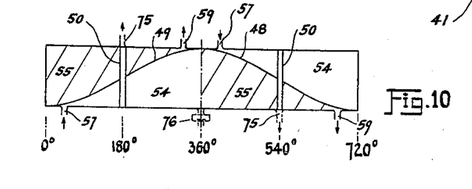
Fig. 10 shows, schematically, the developed diagram of the part of the two helical channels of Fig. 9 which is disposed upon one side of the central partition; the showing extends over two revolutions (720°) in which said channels pass thru one convolution.

In Fig. 10 the substantially sinusoidal curve represents the convolution of the helically disposed wall 49 from 0° to 360°, between 360° and 720° it represents the wall 48, the respective positions of said walls having been exchanged at 360°. The disc 50 is shown in the position of Fig. 5, i. e., at 180° and 540°. The steam chamber, development of which we have observed, extends therefore between 180° and 540°, laterally confronted by the disc 50, and upwardly confronted by the sinusoidal curve. It has attained its largest volume and slightly decreases in size, as the disc advances to the 675° position, in which the chamber 55 has shrunk to a very small cross-section. After the partition has passed over the outlet 59, said outlet becomes connected to the steam chamber, the development of which we have followed, and the disc 50 pushes the steam out of said outlet, as it passes from the 315° position to the 675° position, it then passes to the 720° or 0° position.

Figure 11:
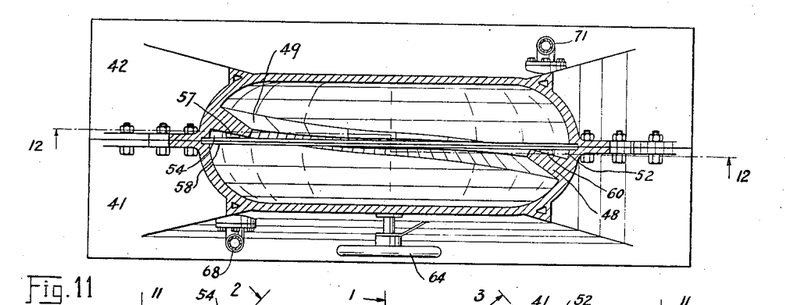
Fig. 11 shows a sectioned top view of the lower part of the engine of Fig. 9. The central partition is omitted.

The steam inlet 57 is shown in the top view of Fig. 11 between the groove 58,—into which the partition 44 slidably extends, outwardly from the concentric annulus 45,—and the helical wall 49. The outlet 60 in the steam chamber 52 at the front of partition 44 is shown in a symmetrical position upon the front of groove 58, between said groove and the helical wall 48.

Figures 12, 13, 14, 15, 16, 17, 18, 19:
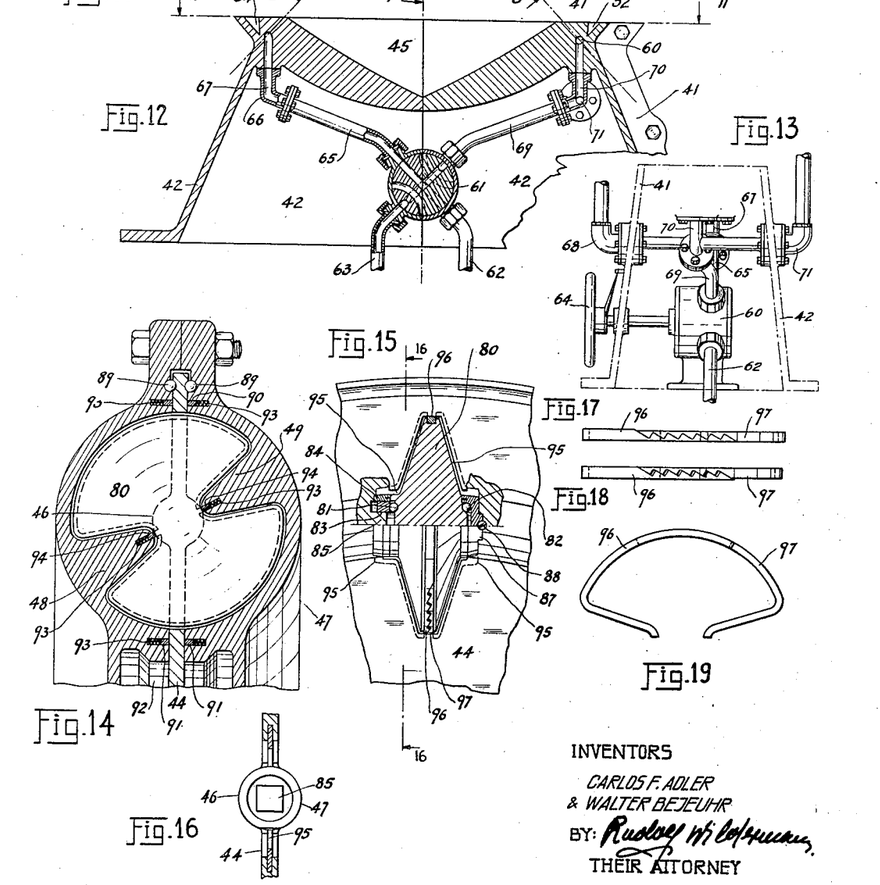
Fig. 12 shows a sectioned, sectional front view of the part of the engine shown in Fig. 11. The planes of the vertical sections to the left and to the right of the center of the engine are slightly staggered in respect to each other.
Fig. 13 shows, in a detail view, the valve means of the engine of Fig. 9.
Fig. 14, exemplarily illustrates packing means used in connection with the engine of Fig. 9 in a sectional cross-sectioned view of the entwined channels.
Fig. 15 shows in a corresponding detail side view, part of the partition and of the partly sectioned disc mounted therein.
Fig. 16 shows, in a sectioned detail end view taken tangentially to the pitch circle of the entwined channels, the means supporting the disc of Fig. 15 in the partition.
Figs. 17 and 18 show, in top views, the piston ring means, used in connection with the disc of Fig. 15, in various operating positions.
Fig. 19 shows a corresponding front view of the piston ring means.

Figs. 12 and 13 show a two-way, double-passage reversing valve 61 which is of standard construction and which is connected to a fluid source a steam boiler for instance, by conduit 62 and from which said fluid is dispensed by conduit 63 after it has passed through the engine. The stem of valve 61 extends through the front 41 of the housing, and is there provided with a hand wheel 64, by means of which the valve may be set in positions of forward and reverse rotation of the engine. In the "forward" position of Fig. 12, the steam supply is connected from conduit 62 through valve 61, to a manifold 65, which is branched off at 66, one branch connecting through conduit 67 to the inlet 57, whereas the other branch 68 (which is shown in Fig. 9 but not in Fig. 12) passes through the front 41 of the housing upwardly to a point above the lower extent of the annulus 45, to the inlet 56. The conduit 63 connects in the position of valve 61 of Fig. 12 to the manifold 69. One branch 70 extends from manifold 69 to the outlet 60 whereas the other branch 71 extends through the rear 42 of the housing to the outlet 59. Reversal of valve 61 will connect conduit 63 to conduit 65, and conduit 62 to conduit 69, so that the inlet and outlet parts of the engine are reversed; the engine will therefore rotate in an opposite, counter-clockwise direction.

If the expansion of the fluid, for instance compressed air or steam, is to be made use of, it is advisable to shift the outlet 59 to the position 75, as indicated in dotted lines in Fig. 10; or the outlet port 75 may be provided in addition to the outlet 59. In that manner, the fluid will be released from the chamber after it has reached maximum expansion, which is at the 180°, 540° position of the disc. When a port 75 is provided, the engine can of course not be reversed without further arrangements. To those acquainted with this art it readily suggests itself that reversing may be brought about by providing at corresponding points of all chambers similar ports 75 which may be selectively controlled by valve 51.

If an inexpansible fluid is used for the operation of our engine, water for instance, provisions have to be made to prevent a counteracting, undesirable vacuum, between the 360° and 540° positions, during which period the chamber enlarges without being connected to any ports. This may be readily brought about by providing a poppet valve 76 at the 360° position, through which air or any other fluid may enter upon the chamber during the period of expansion. Undue compression of the inexpansible fluid may be prevented by the auxiliary port 75.

Our engine has been described up to this point as a prime mover. In the same manner in which a reciprocating engine may be readily converted into a compressor or a vacuum pump, our engine may be converted for such purposes.

The four chambers of our engine perform the work which is ordinarily performed by the four cylinders of an ordinary engine. The chambers 52 and 55, and 53 and 54, on either side of the partition, respectively, are parts which simultaneously perform like work. In that manner the pressures applied to the disc upon both sides of partition 44, are balanced against each other, so that the partition together with the lugs 46 and 47 readily supports the disc in a transverse position. If the disc is well lubricated or is made of self-lubricating material, it will therefore float without trouble in the exact path ascribed to it.

To avoid excessive friction, we may however provide anti-friction means. Thus we exemplarily show a journalling of the disc in Figs. 15 and 16. The disc 80 of those figures is supported by two ball bearings 81 and 82, which are journalled upon the lugs 46 and 47 of partition 44, slightly outside of pitch circle of the annulus so that the axis of the disc 80 is tangential to that circle. The ball race of bearing 81 has an outwardly threaded plug 83, which is engaged by a nut 84. The plug 83 is non-rotatively slidably arranged in the direction of the axis of disc 80, by being mounted upon a square lug 85. By rotation of the nut 84 the bearings of the disc 80 may be tightened up. The bearing 82 is respectively mounted in a transverse slide 87, which is set in a position of alignment with the partition by screw 88. After the screw has been removed, and after the nut 84 has been rotated so as to slide plug 83 back on lug 85, bringing the ball out of engagement with disc 80 the disc 80 together with the journalling means on the slide side may be completely slid out of the partition in a direction at right angles thereto.

Since the coacting parts of the chamber on the two sides of the partition do not at all times act at similar distances from the axis of the main shaft although they are subjected to similar loads at like times but since those loads are not applied at exactly the same radial distance from the axis of shaft 43, the partition 44 is at times exposed to lateral stresses which may be taken up by ball races 89 disposed near the outer periphery of the partition and embedded in the two halves 41 and 42 of the housing. In order to protect the ball races 89, circles of packing 90 are provided in the halves 41 and 42 of the housing, which separate those ball races from the cylindrical annulus, at the same time preventing exchange of fluids between the two halves, into which the annulus is divided by the partition. Similar packing 91 is provided upon two halves 41 and 42 of the housing inwardly from the annulus, this packing serving to prevent diffusion or leaking of the fluids contained in the annulus into the clearance space 92 between the two halves of the housing. Compression springs 93 are embedded in suitable holes of the halves of the housing and compress the packing 90 into engagement with the partition. Exchange of fluids between the halves into which the annulus is divided by the helically disposed walls 48 and 49 is prevented by packing 94, which is pressed by sets of compression springs 93 into sliding engagement upon the half round lugs 46 and 47, and into abutment with the bottom of the truncated sectors in the disc 80.

In the sides of the slot in the partition we provide grooves facing the disc 80 and in these grooves are embedded packing means 95, which serve to seal the disc 80 against the partition. The packing rings 96, 97, a pair of which is accommodated in a suitable groove extending around the periphery of the disc 80 and along the sides of the sectors, serve to separate from each other the chambers into which the annulus is divided by the disc. The two parts 96 and 97 of each ring are provided with serrated parts which are overlappingly engaged upon each other and which allow the ring to be pressed into outward engagement with the cylindrical annulus by the pressure in the chambers, the appearance of that ring changing under such pressure from the view shown in Fig. 18 to that of Fig. 17.

Figures 20, 21, 22, 23, 24, 25:
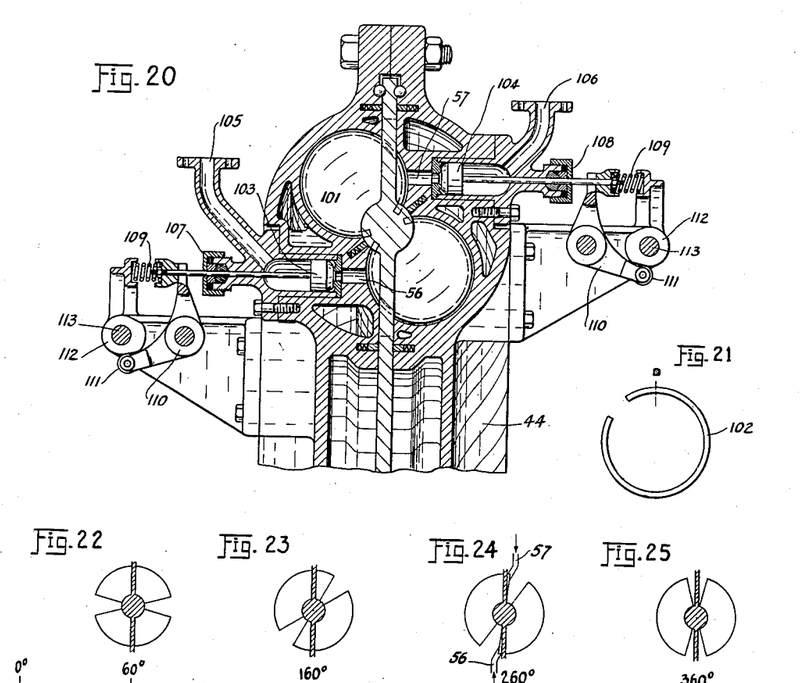
Fig. 20 shows a sectional cross-section of a modification of our engine, said view comprising exemplary valve means.
Fig. 21 shows the front view of a piston ring used on the halves of the figure-eight disc of the modified engine of Fig. 20, and a cross section thereof.
Figs. 22, 23, 24, and 25, show the disc of a modification of the engine of Fig. 9 in various angular positions, as related to corresponding points in the diagrams of Figs. 26 and 27.

Our engine has up to this point been illustrated as means which are served by inlet and outlet ports which do not require any cyclically operated valves, (disregarding the poppet valve 76). A better use of the kinetic energy of expansion stored in the steam may be brought about by providing mechanically operated valves, as indicated in Fig. 20. The showing of these drawings also serves to illustrate, that our helically disposed chambers do not necessarily have to aggregate complementarily to an annulus, but that they may assume other forms in modifications which may be prescribed by particular circumstances. In relation to the positions shown by the cross-sections of Figs. 1 to 8, the showing of Fig. 20 may be compared with Fig. 2, the cross-section of that figure being viewed in the opposite direction.

The "disc" 101 of this modification has a substantially figure 8 shape, each of the two entwined channels being substantially cylindrical. Though we here really have a double disc, a plate, the term "disc" is applied, in order to provide uniformity of expression throughout the specification. The chambers are therefore formed by two helically entwined rings or channels, each of which is cylindrical. A particular advantage of such a modification is offered in respect to packing the disc. Fig. 21 shows the extremely simple packing ring, a pair of which is used in connection with one figure 8 disc 101. The ports 56 and 57 of this modification are provided with valves 103 and 104, through which the steam is supplied from manifolds 105 and 106. The valve stems extend through packings 107 and 108 to compression springs 109 which force these valves into normally closed positions. The stems are engaged by angle levers 110, the free ends of which are provided with rollers 111. The rollers 111 are engaged upon cams 112 on cam shafts 113, said cam shafts being positively geared to the main shaft of the engine.

The valves 103 and 104 are operated each time a disc 101 has passed the respective ports 105 and 106. They are then opened to admit the steam; after a predetermined time interval they are closed again, the admitted steam being allowed fully to expand in the enlarging chambers. In order to permit ready comparison between this engine, in which cyclically operated valves are used, and the showing of the preceding figures, Figs. 22, 23, 24, 25, 26, and 27 are executed in a manner similar to that of Figs. 1 to 8 and 10. These diagrams serve to illustrate that there may be a relative decrease of the pitch of the helix of the chamber as well as an increase in the number of discs used, without departing from the spirit of this invention; it is not possible to lay down a fixed rule for the arrangement and proportionate number and shape of these parts under all circumstances. In this particular instance we have adopted a ratio of 4:3 between the number of interposed elements, half discs precisely speaking, to convolutions, of the helically entwined chamber; the showing of Figs. 1 to 10 shows that ratio to be 1:1.

A fair efficiency is attained with the arrangement of Figs. 22 to 27. It is understood that the discs must be spaced evenly and that the half convolutions of the spirally entwined channels must also evenly divide into the pitch circumference or one revolution of those chambers. In the degree to which the pitch of the convolutions of the helically entwined channels is decreased in relation to the pitch circumference of one revolution of the chambers, a more favorable and more efficient ratio between discs and full convolutions may be adapted.

Whereas the prior showing involved one disc, and a helix of a pitch equal to twice the circumference of the pitch circle of the helically entwined chamber unit, we here exemplarily show two discs, and chambers which are disposed in a helix with a pitch equal to ⅔ of the pitch circumference of the entwined helical channels. In other words, whereas in the previous showings the entwined chambers pass, per revolution, through half a convolution, and then endlessly merge with each other, the chambers of this showing pass through one and one-half convolutions for one revolution of the engine.

Figure 26:
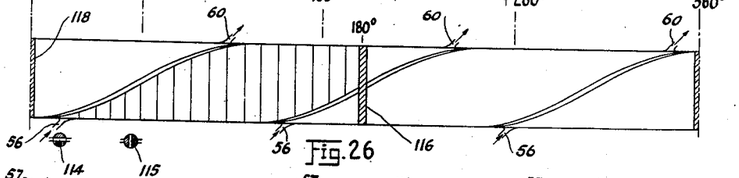
Figs. 26 and 27 show, in a diagrammatic view, the developed halves of the helical chambers of a modified engine, the pitch of the helix of said chambers being a fraction of the circumference of the circle along which said chambers are disposed.
Figure 27:
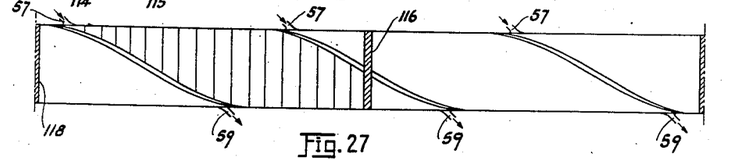

The diagrams 26 and 27 show the two halves into which the chamber unit is divided by the partition, but each of these halves of the unit is developed for only one revolution (360°), whereas the showing of Fig. 10 extended over two turns, 720°.

It will be seen that by this kind of an arrangement we obtain full expansion in the chambers. Valves 103 and 104 are indicated by the numerals 114 and 115 at the positions of the discs in respect to the chambers at which said valves open and close. Between said positions of the disc steam is admitted and the shaded part of the chamber indicates to what volume the admitted steam has expanded, when the disc has reached the 180° position. While the disc moves on, further expansion occurs, but near the end, before the disc 116 reaches the exhaust port 117, the second disc 118 is moved into the chamber and reduces the volume of the expanded steam for a fraction of the volume reached thereby at maximum expansion. Immediately thereafter the disc 116 passes the outlet 60 (59) so that the disc 118 now evacuates the steam from the chamber through that outlet.

It is seen from these diagrams that only a regulation of the inlet port by cyclically operated valves is necessary.

Figs. 28, 29, 30, and 31 exemplarily show how the principle of our invention may be utilized for internal combustion motors. Two units 120 and 121 are assembled side by side, substantially in parallelism, each of said units being independent, but the respective partitions 122 and 123 being mounted on a common shaft. The front unit 121 of the twin engine is the compression unit whereas the rear part 120 is the explosion unit. The number of parts and the pitch of the helix corresponds for each half 120 and 121 to the showing of Figs. 26 and 27. The three sets of chambers of the compression and explosion unit which face each other between the two units 120 and 121, are connected by conduits 124, each end of which may be closed by a cock 125; the pairs of cocks 125, in relation to said three sets of chambers, are referred to in the drawings by indices a, b, and c respectively. The operation of these cocks is controlled from the main shaft of the engine by suitable, positive gearing. In a similar manner a conduit 126, which is provided with mechanically operated cocks 127, connects the chambers of the compression and explosion units, which are disposed outwardly from the two partitions 122 and 123.

Figures 28, 29, 30:
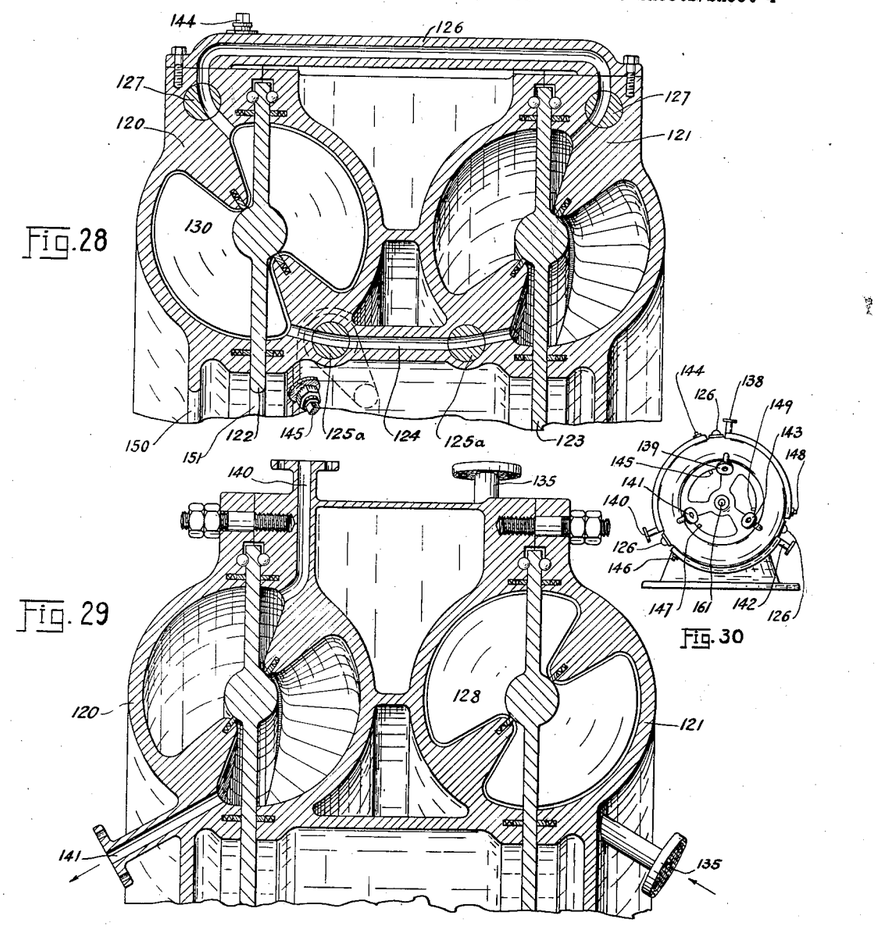
Figs. 28 and 29 show sectional cross-sections of a twin internal combustion engine involving our invention, said sections being respectively taken at the positions of the intercommunicating conduits, and of the inlets and outlets of said engine.
Fig. 30 shows a schematic rear view of the twin engine in which the position of the ignition means is indicated.
Figure 31:
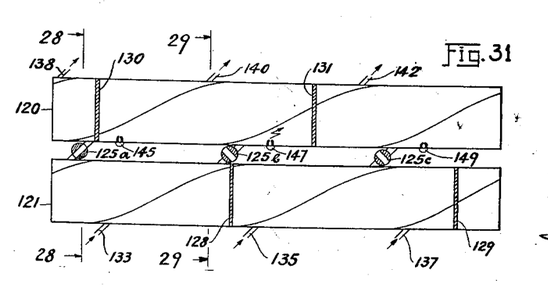
Fig. 31 illustrates in a diagrammatic developed view, the cycle of the twin combustion engine of Figs. 28 and 29. It relates to intercommunicated halves of each twin part of said engine.
Figures 32, 33, 34:
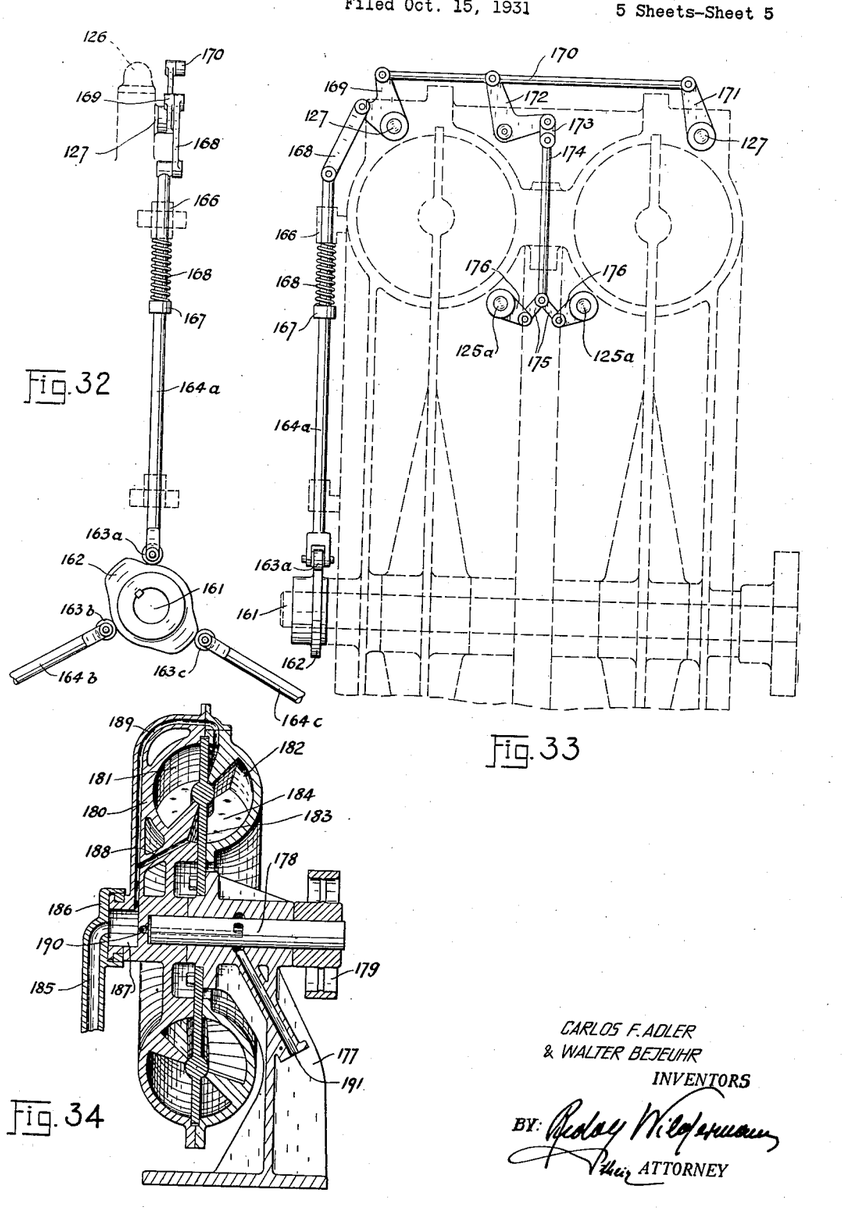

The gearing by which the valves 125 and 127 are operated, is shown in Figs. 32 and 33, the plane of the view of Fig. 33 being slightly angularly displaced from the section of Fig. 28.

On the main shaft 161 is mounted the double cam 162. The rollers 163a, b and c, which are mounted upon the ends of the valve rods 164a, b and c are pressed onto cam 162 by the springs 165; these springs act thrustwise between the bracket 166 mounted on the engine housing and the shoulders 167.

The rods 164 radially reciprocate in respect to shaft 161 and those movements are transmitted by links 168 to the double levers 169 on the stems of one set of cocks 127. By means of the connecting rods 170 an angular movement similar to that of double levers 169 is imparted to levers 171 on the other set of cocks 127. The angle lever 172 is similarly actuated by rod 170 and the angular movement thereof is transmitted by links 173, slide rods 174, links 175 and levers 176 to the stems of cocks 125, so that each of the three sets of cocks 125 and 127, which are angularly spaced 120° apart from each other, are predeterminedly cyclically opened and closed.

The discs 128 and 129 of the compression chamber and the discs 130 and 131 of the expansion chamber are relatively disposed in the manner shown in the diagram in Fig. 21. The same applies to the pairs of inlet ports 133, 135 and 137 on the compression chamber, and to the pairs of exhaust ports 138 and 139, 140 and 141, and 142 and 143, on the explosion chamber. Each pair of these intake and exhaust ports is angularly aligned. The firing takes place after the fully compressed charge has been transferred through conduits 124 and 126 from the compression unit to the explosion unit, and after the cocks 125 and 127 had been closed. The pairs of spark plugs 144 and 145, 146 and 147, and 148 and 149, are respectively in angular alignment, at positions indicated in Fig. 30. Cock 135b of Fig. 31 having just been closed, spark plug 147 fires at the instant of observation. The spark plugs 145, 147 and 149, may be approached through suitable openings 150 and 151 in the wall of the rear part 120 of the housing and openings 151 in the partition 122.

The modification of Fig. 34 represents a reversal of the arrangement of Fig. 9. The bracket 177 is stationary, and rotatably supports the shaft 178, which carries at one end the pulley 179 and at the other end the casing 180 with the helically entwined chambers 181 and 182. The partition 183 and the discs 184 are shaped similar to the partition 144 and discs 180 of Fig. 9; but whereas the discs 144 rotate around their own axis, said discs and the partition 183 are angularly fixedly disposed in respect to the axis of shaft 178.

The steam is introduced by a conduit 185,—a stationary coupling 186 upon the end of which is rotatably mounted upon the end of the casing 180,—opening into a chamber 187, which is centrally disposed in said casing. From said casing the steam is introduced into the helically entwined chambers at locations corresponding to the layout of Figs. 1, 2, 3, 4, 5, 6, 7, 8, the respective conduits 188 and 189 being incorporated in the casing 180.

The steam outlet takes place through similar conduits, which lead into a manifold 190 in the casing. From said casing, the exhaust vapors pass through the shaft 178 to the outlet 191.

The action of this engine is equivalent to that of Fig. 9. It will readily be noticed that, when the pitch of the helically entwined channel is less than twice the circumference at the pitch diameter of the entwined channels, the inlet and exhaust may respectively be introduced through the stationary bracket 177, and the stationary partition 183, at points, where the helically entwined channels start to develop.

While we have shown and described our invention with some degree of particularity, it will be realized that other modifications and changes may be resorted to under special conditions. We therefore do not wish to be limited and restricted to the exact details shown and described, but reserve the right to make such changes and modifications as may fairly fall within the scope of the subject matter now being claimed.

Having thus described our invention, what we claim is:

1. In a rotary engine, a casing having toroidally disposed helically entwined channels interconnected along their whole length by way of a passage, a partition closing said passage intersecting all of said channels and dividing them into compartments of like size, and a disc supported by said partition, extending to both sides thereof into said compartments and transversely disposed in said channels, said channels being movable relatively to said partition and said disc.

2. In a rotary machine, a casing having a toroidal chamber, a partition rotatable relatively to said casing and wholly intersecting said chamber, helical teeth extending in said casing toward the center of the chamber throughout its circumferential extent, and means movable in but transversely closing said chamber and rotatably supported by said partition.

3. In a rotary machine, a casing having a toroidal chamber, a partition rotatable relatively to said casing and wholly intersecting said chamber, a tooth extended as an endless helix in said chamber, said partition slidably traversing said tooth where it merges with said tooth but complementarily with said tooth dividing said chamber into longitudinally attenuated parts along the remaining longitudinal extent at the circular center line of said chamber, and means movable in but transversely closing said chamber and rotatably supported by said partition.

4. In a rotary machine, a casing having a toroidal chamber, a partition rotatable relatively to said casing and wholly intersecting said chamber, helical teeth extending in said casing toward the center of the chamber throughout its circumferential extent, means revolvable in and transversely closing said chamber, and a tore forming part and protruding from opposite sides of said partition, disposed along the circular centerline of said chamber, closingly abutting upon the tops of said teeth and thrustwise rotatably retaining said means.

5. In a rotary machine, a casing having a toroidal chamber, said chamber comprising two wings which communicate by a passage and which are helically twisted relatively to a circle, a partition wholly intersecting said chamber, closing said passage and revolving relatively to said casing, and a rotatable disc endwise supported by said partition and transversely closing but movable in said chamber.

6. In a rotary machine, a casing having a toroidal chamber, said chamber comprising two wings which communicate by a passage and which are helically twisted relatively to a circle, a partition wholly intersecting said chamber, closing said passage and revolving relatively to said casing, and a disc shaped member to fit the cross-section of said chamber, and slidably extending through and normal to said partition.

7. In a rotary machine, a casing having a toroidal chamber, said chamber comprising two wings which communicate by a passage and which are helically twisted relatively to a circle, a partition at said circle wholly intersecting said chamber, closing said passage and revolving relatively to said casing, and a disc shaped to fit the cross-section of said chamber, and slidably extending through and normal to said partition.

8. In a rotary machine, a casing having a toroidal chamber, a partition rotatable relatively to said casing and wholly intersecting said chamber, helical teeth extending in said casing toward the center of the chamber throughout its circumferential extent, said teeth and said partition dividing said chamber into a plurality of compartments, and an intake and an outlet port for fluids on each of said compartments.

9. In a rotary machine, a casing having a toroidal chamber, a partition rotatable relatively to said casing and wholly intersecting said chamber, helical teeth extending in said casing toward the center of the chamber throughout its circumferential extent, said teeth and said partition dividing said chamber into compartments with attenuated ends, and fluid ports at said ends.

10. In a rotary machine, a casing having a toroidal chamber, a partition rotatable relatively to said casing and wholly intersecting said chamber, helical teeth extending in said casing toward the center of the chamber throughout its circumferential extent, said teeth and said partition dividing said chamber into compartments with attenuated ends, conduits interconnecting sets of said compartments, and ignition means in one compartment of each of said sets.

11. In a rotary engine, a casing having sets of endless, helically entwined channels, partitions wholly intersecting the channels of said sets, discs substantially normal to and rotatably supported by said partitions and slidably disposed in said channels, said casing being movable relatively to said partitions and said discs, ports admitting and emitting fluids to spaces confronted in each of said sets of channels by said partitions and discs during the relative movement of said casing and of said partitions and said discs, predeterminedly controlled conduits connecting the fluid emitting ports of one of said sets to the fluid admitting ports of a second set of said channels, and means igniting the fluids transmitted from said one set of channels to said second set of channels.

12. In a rotary engine, a frame through which extends endlessly a circular hole, walls diametrically intersecting said hole, and dividing it into compartments disposed along a circle in the direction of the extent of said hole, one of said walls being a helix so that said compartments decrease and increase in cross-section along said circle, and means transversely sub-dividing said compartments and movable in said hole along said circle relatively to said frame.

13. In a rotary engine, a frame through which extends endlessly a circular hole, walls diametrically intersecting said hole, and dividing it into compartments disposed along a circle in the direction of the extent of said hole, one of said walls being a helix so that said compartments increase from zero cross-section to substantially the cross-section of said hole, and means transversely sub-dividing said compartments and movable in said hole along said circle relatively to said frame.

14. In a rotary engine, a frame through which extends endlessly a circular hole, walls diametrically intersecting said hole, and dividing it into compartments disposed along a circle in the direction of the extent of said hole, one of said walls being a helix so that said compartments complementarily decrease and increase along said circle, and means transversely sub-dividing said compartments and movable in said hole along said circle relatively to said frame.

15. In a rotary engine, a frame through which extends endlessly a substantially circular hole of uniform diameter, walls diametrically intersecting said hole, and dividing it into compartments disposed along a circle in the direction of the extent of said hole, one of said walls being a helix so that said compartments complementarily decrease and increase in cross-section along said circle, and means transversely sub-dividing said compartments and slidable in said hole along said circle relatively to said frame.

16. In a rotary engine, a casing having channels helically entwined in respect to a circle, a passage connecting said channels at said circle, a partition disposed along said circle, closing said passage and bisecting said channels, a disc substantially normal to and rotatably supported by said partition, traversing said passage and slidably disposed in and closing said channels, said casing being movable relatively to said partition and said disc, and ports admitting and emitting fluids to and from said channels substantially at points from and to which increase and decrease, respectively, spaces confronted in said channels by said partition and disc during the relative movement of said channels and of said partition and said disc.

17. In a rotary engine, a rotatable partition, a plate slidably extending transversely through said partition, and a frame supporting said partition and provided with an endless, helically twisted opening of a cross-section which slidably accommodates said plate, said opening being intersected by said partition.

18. In a rotary engine, a rotatable partition, a plate slidably extending transversely through said partition, and a frame supporting said partition and provided with endless, helically entwined and connecting holes of a combined cross-section which slidably accommodates said plate, each of said openings being intersected by said partition, and said partition closing said holes relatively to each other where they connect.

19. In a rotary engine, a rotatable partition, a plate revolvably extending transversely through said partition, and a frame supporting said partition and provided with endless, helically entwined, interconnecting holes throughout of a combined cross-section which slidably accommodates said plate, each of said holes being intersected and being closed relatively to the other hole by said partition but their combined cross-section being bisected by said partition throughout their endless extent.

20. In combination with a shaft, a housing relatively rotatably assembled with said shaft and provided with an endless chamber which extends around said shaft along a circle and which is twisted upon itself around said circle, and two parts of which said housing is assembled, each of said parts containing volumetrically substantially one half of said chamber, of an engine, two substantially flat elements operatively connected with each other and said shaft and movable through said chamber with said shaft, one of said elements substantially fitting the cross-section of and interrupting the endless extent of said chamber, the other element being disposed substantially in the plane of said circle but traversing said twisted chamber and dividing it into attenuated compartments, and fluid inlets and outlets substantially at the attenuated ends of said compartments.

21. In combination with a shaft, and with a housing relatively rotatably assembled with said shaft provided with an irregularly cross-sectioned endless chamber which spacedly extends around said shaft and is twisted upon itself along a circle, said housing being assembled from two parts substantially at said circle, each of said parts containing volumetrically substantially one half of said chamber, of an engine, two substantially flat elements operatively connected with each other and said shaft and movable through said chamber around said shaft, one of said elements slidably fitting the cross-section of said chamber and interrupting the endless extent of said chamber, the other element being disposed substantially along said circle, but traversing said twisted chamber and dividing it into attenuated compartments, and fluid inlets and outlets substantially at the attenuated ends of said compartments.

22. An engine, comprising a housing shaped around an annular chamber of circular cross-section, a partition travellably extending through said housing and substantially bisecting said chamber, a wall disposed in said chamber radially in respect to a cross-section and helically in respect to the annular extent of said chamber and slidably abutting upon said partition, and a disc revolvably supported by said partition, transversely dividing—and slidable in said housing in the direction of the annular extent of—said chamber and provided with a cut slidably clearing said wall, and ports in said housing issuing upon the ends of the compartments into which said chamber is divided by said partition and wall.

23. An engine, comprising a housing shaped around an annular chamber of circular cross-section, a partition travellably extending through said housing and substantially bisecting said chamber, a wall disposed in said chamber radially in respect to a cross-section and helically in respect to the annular extent of said chamber, said wall being endless but provided with a cut slidably clearing said partition, and a disc operatively engaged upon said partition, transversely dividing,—and slidable in the direction of the annular extent in—said chamber and provided with a cut slidably clearing said wall, and ports in said housing issuing upon the ends of the compartments into which said chamber is divided by said partition and wall.

24. An engine, comprising a housing through which extends an annular chamber of circular cross-section, a partition travellably extending through said housing and substantially bisecting said chamber, a wall disposed in said chamber diametrically in respect to a cross-section and helically in respect to the annular extent of said chamber and slidably clearing said partition, and a disc operatively engaged upon said partition, transversely dividing—and slidable in said housing in the direction of the annular extent of—said chamber and provided with a cut slidably clearing said wall, and ports in said housing issuing upon the ends of the compartments into which said chamber is divided by said partition and wall.

25. An engine, comprising a housing through which extends an annular chamber of circular cross-section, a partition travellably extending through said housing and substantially bisecting said chamber, a wall disposed in said chamber diametrically in respect to a cross-section and helically in respect to the annular extent of said chamber and endless but provided with a cut slidably clearing said partition, and a disc operatively engaged upon said partition, transversely dividing—and slidable in said housing the annular extent of—said chamber and provided with a cut slidably clearing said wall, and ports issuing through said housing upon the ends of the compartments into which said chamber is divided by said partition and wall.

26. An engine, comprising a housing through which extends an annular chamber of circular cross-section, a partition travellably extending through said housing and substantially bisecting said chamber, a wall forming part of said housing and disposed in said chamber radially in respect to a cross-section and helically in respect to the annular extent of said chamber and slidably clearing said partition, and a disc operatively engaged upon said partition, transversely dividing—and slidable in said housing in the direction of the annular extent of—said chamber and provided with a cut slidably clearing said wall, and an inlet port in said housing at one end of and an outlet port in said housing intermediate to the ends of the compartments into which said chamber is divided by said partition and wall.

CARLOS F. ADLER.
WALTER BEJEUHR.